United States Patent

Arai et al.

[11] Patent Number: 5,290,488
[45] Date of Patent: Mar. 1, 1994

[54] METHOD FOR MOLDING OPTICAL ELEMENTS

[75] Inventors: Takashi Arai, Tokyo; Yukihisa Baba, Yokohama; Sachio Umetsu, Kawasaki, all of Japan

[73] Assignee: Canon Kabushiki Kaisha, Tokyo, Japan

[21] Appl. No.: 874,099

[22] Filed: Apr. 27, 1992

[30] Foreign Application Priority Data

Apr. 30, 1991 [JP] Japan ................ 3-099185
Jun. 24, 1991 [JP] Japan ................ 3-151267
Apr. 20, 1992 [JP] Japan ................ 4-099334

[51] Int. Cl.⁵ .............................. B29D 11/00
[52] U.S. Cl. ........................ 264/1.7; 264/1.4
[58] Field of Search ............... 264/1.4, 1.7; 29/527.1, 29/527.2, 527.4

[56] References Cited

U.S. PATENT DOCUMENTS

| | | | |
|---|---|---|---|
| 3,423,488 | 1/1969 | Bowser | 264/2.2 |
| 3,428,533 | 2/1969 | Pichel | 264/2.5 X |
| 4,061,518 | 12/1977 | Burroughs et al. | 156/232 |
| 4,116,753 | 9/1978 | Tojyo et al. | 156/629 |
| 4,155,962 | 5/1979 | Neefe | 264/2.5 |
| 4,159,292 | 6/1979 | Neefe | 264/2.4 |
| 4,235,654 | 11/1980 | Dohi et al. | 156/99 |
| 4,623,496 | 11/1986 | Verhoeven et al. | 264/1.7 |
| 4,738,516 | 4/1988 | Verhoeven et al. | 350/432 |

FOREIGN PATENT DOCUMENTS 62-272203 11/1987 Japan .
62-288030 12/1987 Japan ................ 264/1.7

Primary Examiner—Leo B. Tentoni
Attorney, Agent, or Firm—Fitzpatrick, Cella, Harper & Scinto

[57] ABSTRACT

A method and apparatus for molding optical elements in which peeling between a glass member and a resin layer and between a mold member and the resin layer will not occur while at the same time it is possible to accurately bring the central axis of the glass member and the central axis of the molding surface into alignment. This is accomplished by a first step of placing the glass member upon a support portion, a second step of positioning the glass member relative to the mold means when a resin material, which has been charged into a space defined by the molding surface and the surface of the glass member, exhibits a viscosity within a predetermined range, a third step of holding the glass member at a predetermined position until the resin material cures to a predetermined ratio of polymerization, and a fourth step of releasing the glass member from the held state after the resin material has cured to the predetermined ratio of polymerization.

6 Claims, 9 Drawing Sheets

METHOD FOR MOLDING OPTICAL ELEMENTS

BACKGROUND OF THE INVENTION

This invention relates to a method and apparatus for molding an optical element in which a resin layer is integrally molded on the surface of a glass member.

In the prior art, a method is known in which a thin film comprising a resin material is molded on the surface of a glass member to form a lens having an aspherical shape, which is difficult to work when the material is glass. The lens molded by this method generally is referred to as a replica lens.

In this method of molding a replica lens, it is required that the optic axis of the glass member and the central axis of a mold for transferring a prescribed aspherical shape to the glass member be made to accurately coincide in order to assure the optical performance of the completed replica lens. A known example of a method of aligning the optic axis of the glass member and the central axis of the mold involves providing the outer peripheral surface of the glass member with a flange and fitting the outer circumferential surface of the flange into a fitting portion formed in the mold, as disclosed in the specification of Japanese Patent Application Laid-Open (KOKAI) No. 62-272203. Another example known in the art, as disclosed in the specification of Japanese Patent Application Laid-Open (KOKAI) No. 62-288030, involves clamping surfaces, which have been worked to a spherical shape, on both sides of the glass member by a so-called bell clamp, and aligning the optic axis of the glass member and the central axis of the mold by utilizing the centripetal action of the bell clamp.

However, the former method in which the glass member is provided with a flange requires the expenditure of labor for the work involved in forming the flange on the glass member, and therefore a problem which arises is an increase in the cost of manufacturing the lens. In addition, since the flange is provided on the outer peripheral portion of the glass member, the lens is large in size. Furthermore, the goal of this method is to align the optic axis of the spherical portion of the glass member with the central axis of the mold. However, when the outer circumferential surface of the flange is fitted into the mold to achieve positioning, as set forth above, any offset between the optic axis of the spherical portion of the glass member and the central axis of the outer circumferential surface of the flange due to a machining error or the like will cause the optic axis of the spherical portion to deviate correspondingly from the central axis of the mold.

Further, when a resin material is molded by a mold, the resin material usually contracts as it cures. Owing to slight differences in the degree of contraction in the radial direction of the resin material at various parts thereof, the resin material usually contracts not toward the central axis of the glass member but about a position offset slightly from the central axis. As the resin material cures, therefore, a force which attempts to move the glass member relative to the mold a very small distance in the radial direction acts upon the glass member. In a case where the glass member is fixed relative to the mold in order to center the glass member, as mentioned above, the glass member is incapable of moving relative to the mold member even though it is subjected to the aforementioned force as the resin material cures. A problem which arises as a result is that the resin material peels off the surface of the glass member or the molding surface of the mold member.

In the latter method which uses the bell clamp, the centripetal force is too weak if the radius of curvature of the spherical surface of the glass member is large and approximates a planar surface. As a result, the glass member and the mold cannot be positioned accurately.

SUMMARY OF THE INVENTION

An object of the invention is to provide a method and apparatus for molding an optical element in which peeling between the glass member and the resin layer and between the mold member and the resin layer will not occur.

Another object of the invention is to provide a method and apparatus for molding an optical element in which it is possible to accurately align the central axis of a mold member and the central axis of a molding surface.

Still another object of the invention is to provide a method and apparatus for molding an optical element in which it is possible to accurately align the central axis of a mold member and the central axis of a molding surface without subjecting the glass member to special working, and in which the optical element is not made large in size.

According to a first aspect of the present invention, the foregoing objects are attained by providing an optical-element molding method for forming an optical element in which a glass material and a resin material are integrated by forming a resin layer, which has a predetermined surface shape, on a surface of a glass member by molding work, comprising a first step of placing the glass member upon a support portion for supporting the glass member in a state in which the surface of the glass member is spaced away from a molding surface by a distance which determines the thickness of the resin layer, wherein the molding surface is for transferring the predetermined surface shape to the surface of the resin layer, a second step of positioning the glass member, relative to mold means, at a predetermined position in a direction along a surface approximately parallel to the molding surface when the resin material, which has been charged into a space defined by the molding surface and the surface of the glass member, exhibits a viscosity within a predetermined range, a third step of holding the glass member at the predetermined position until the resin material cures to a predetermined ratio of polymerization, and a fourth step of releasing the glass member from the held state after the resin material has cured to the predetermined ratio of polymerization.

According to a second aspect of the present invention, the foregoing objects are attained by providing an optical-element molding method for forming an optical element in which a glass material and a resin material are integrated by forming a resin layer, which has a predetermined surface shape, on a first surface of a glass member by molding work, comprising a first step of placing the glass member upon a support portion for abutting against an outer peripheral portion of the first surface of the glass member and supporting the glass member in a state in which the first surface thereof is spaced away from a molding surface by a distance which determines the thickness of the resin layer, wherein the molding surface is for transferring the predetermined surface shape to the surface of the resin layer, a second step of mounting a cover on the support portion, wherein the cover has a clamp portion for abutting against an outer peripheral portion of a second surface of the glass member that opposes the first surface thereof and clamping the glass member on the support portion, and a third step of relatively rotating the support portion and the cover in a state in which an outer peripheral surface of the support portion and the an inner peripheral surface of the cover are fitted together.

Further, according to the first aspect of the present invention, the foregoing objects are attained by providing an optical-element molding apparatus for forming an optical element in which a glass material and a resin material are integrated by forming a resin layer, which has a predetermined surface shape, on a surface of a glass member by molding work, comprising mold means having a molding surface for transferring the predetermined surface shape to the surface of the resin layer, and a support portion for supporting the glass member in a state in which the surface of the glass member is spaced away from the molding surface by a distance which determines the thickness of the resin layer, and positioning means for positioning the glass member in a direction along a plane approximately parallel to the molding surface when the resin material, which has been charged into a space defined by the molding surface and the surface of the glass member, exhibits a viscosity within a predetermined range, and releasing the glass member from the positioned state when the resin material has attained a predetermined ratio of polymerization.

Further, according to the second aspect of the present invention, the foregoing objects are attained by providing an optical-element molding apparatus for forming an optical element in which a glass material and a resin material are integrated by forming a resin layer, which has a predetermined surface shape, on a first surface of a glass member by molding work, comprising mold means having a molding surface for transferring the predetermined surface shape to the surface of the resin layer, supporting means having a support portion formed on a circumference of a circle, whose central axis is an optic axis of the molding surface, on a side outwardly of the molding surface for supporting the glass member in a state in which the surface of the glass member is spaced away from the molding surface by a distance which determines the thickness of the resin layer, and a cylindrical outer peripheral surface whose central axis is the optic axis of the molding surface, cover means which includes a fitting portion having an inner peripheral surface fitted on the outer peripheral surface of the supporting means so as to be slidable in circumferential and axial directions, a roof portion for sealing an upper face of the fitting portion, and a clamp portion, which is formed on a circumference of a circle whose central axis is the optic axis of the molding surface, on a lower face of the roof portion for abutting against a second surface of the glass member that opposes the first surface thereof, and rotational drive means for relatively rotating the supporting means and the cover means, with the optic axis of the molding surface serving as a central axis, in a state in which the outer peripheral surface of the supporting means is fitted into the inner peripheral surface of the fitting portion.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiment of the invention, and therefore reference is made to the claims which follow the description for determining the scope of the invention.

DESCRIPTION OF THE PREFERRED EMBODIMENTS

Preferred embodiments of the present invention will now be described in detail with reference to the accompanying drawings.

First Embodiment

Figure 1:
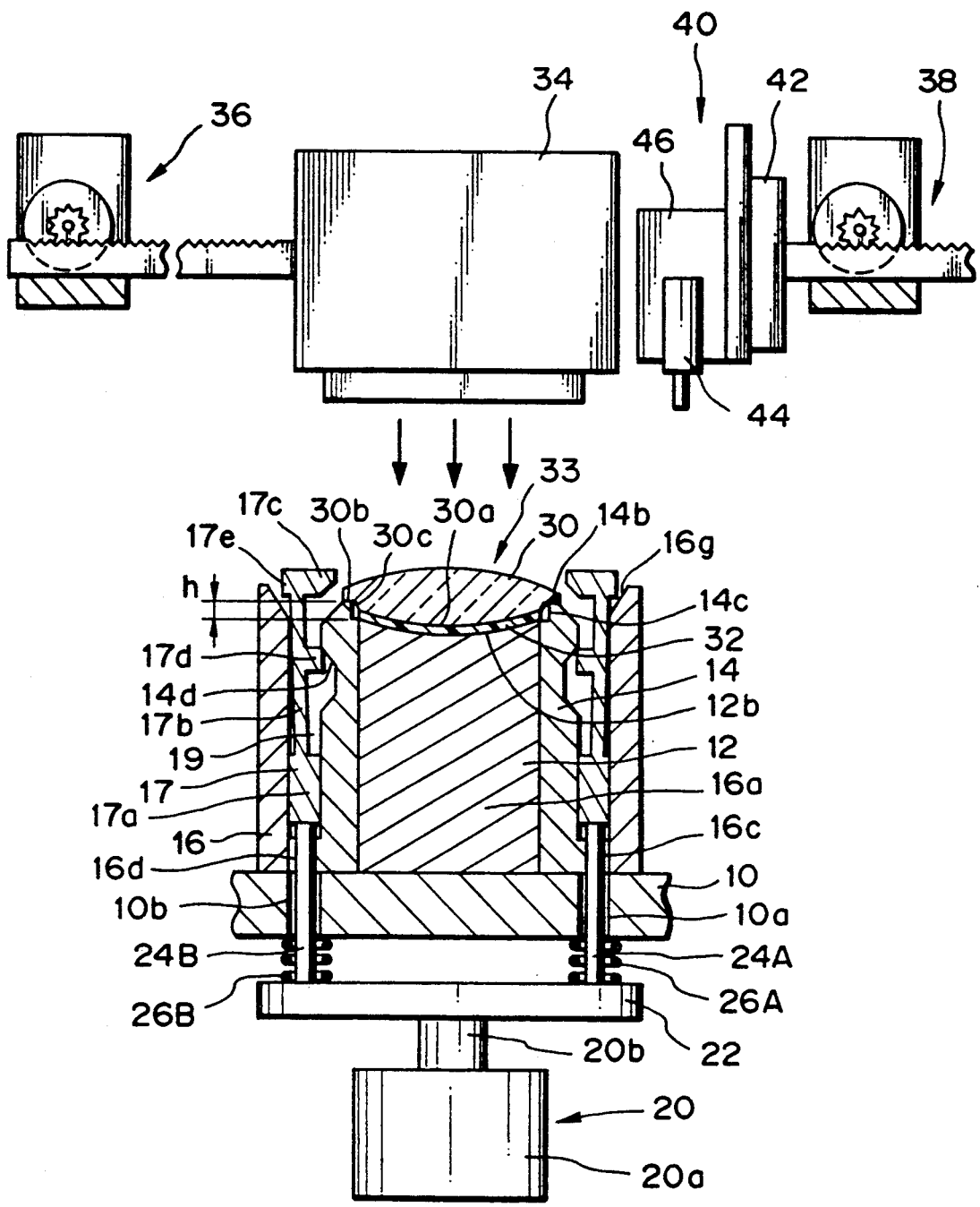
FIG. 1 is a diagram illustrating the construction of an apparatus for molding optical elements according to a first embodiment of the present invention.

FIG. 1 is a diagram showing the general structure of a molding apparatus used when molding an aspherical lens by a method of molding an optical element according to a first embodiment of the present invention.

Before the construction of the molding apparatus is discussed, the particulars of a method of molding the optical element of the first embodiment will be described. The method of molding the optical element of this embodiment involves forming a shape, of a kind which is difficult to work in the case of a glass material, on the surface of a glass material, and forming a resin layer having a surface of a prescribed complicated shape and consisting of a resin material on the surface of a glass member worked into a shape that is comparatively easy to work. An example is fabrication of an aspherical lens in which a film of resin having an aspherical shape is molded on the surface of a glass member worked into a spherical shape to combine the glass material and the resin material. In other words, in order to provide a lens in which aberration is corrected by a single lens, it is necessary that the surface shape of the lens be made aspherical. However, it is not easy to work a glass material into an aspherical shape, and it is difficult to realize lens power with a lens which uses a resin that is readily molded into an aspherical shape. Accordingly, it has been attempted to exploit the advantages of both types of lenses by combining them. A lens thus manufactured in referred to as a replica lens.

More specifically, as shown in FIG. 1, a resin layer 32 comprising a thin resin film of a type cured by an activating energy beam is formed on one surface, namely a contact surface 30a, of a glass member 30 whose surface has been worked to a spherical shape. The glass member 30 has a flange-shaped rim portion 30b on its outer circumference and is retained on a support member 14 with the rim portion 30b in abutting contact with an upper end face 14b of the support member 14. The upper end face 14b of the support member 14 protrudes by a height h from the edge portion of a molding surface 12b of a mold member 12 that is for molding the surface shape of the resin material. By virtue of the amount of protrusion h, the thickness of the resin layer 32 is decided (Since the molding surface 12b is aspherical in shape, the thickness of the resin layer differs depending upon the location.) The space defined by the molding surface 12b of the mold member 12 and the contact surface 30a is filled with a liquified resin material. By irradiating this resin material with an activating energy beam, the resin material is cured to complete a replica lens 33.

The construction of the apparatus for molding and working the replica lens will now be described in accordance with FIG. 1. Numeral 10 denotes a base plate which holds the mold member 12 for molding the resin layer 32, as well as the support member 14 for supporting glass member 30. The base plate 10 is provided so as to extend horizontally. The mold member 12, the support member 14, a molding frame 16 and a chucking member 17 are supported on the top side of the base plate 10. An air cylinder 20 for moving the chucking member 17 relative to the mold member 12 is disposed beneath the base plate 10.

More specifically, the frame 16, the central portion of which has a columnar cavity 16a opening vertically upward, is fixed to the top side of the base plate 10. A cylindrically shaped support member 14 having an outer diameter slightly less than the inner diameter of the columnar cavity 16a is inserted into the cavity 16a. The cylindrical support member 14 is secured in the central part of the columnar cavity 16a, and the mold member 12, which has an outer peripheral surface that mates with the inner peripheral surface of the support member 14 is fitted into the support member 14. The mold member 12 also is secured to the frame 16 in the same manner as the support member 14.

A cylindrical space 19 is formed between the outer wall of the support member 14 and the inner wall of the frame 16. The approximately cylindrical chucking member 17 is fitted into the space 19 with the inner and outer peripheral surfaces of the fitting portion 17a on its lower side mated with the outer wall of the support member 14 and the inner wall of the frame 16, respectively. The chucking member 17 is capable of being slid in the axial direction (i.e., up and down in FIG. 1) while its fitting portion 17a is guided by the outer wall of the support member 14 and the inner wall of the frame 16.

The upper portion of the chucking member 17 has a shape obtained by dividing the cylinder constituting it into four equal portions. Each of the portions thus obtained forms an arm 17b. The arm 17b is formed to have less thickness than the fitting portion 17a. As a result, the arm 17b is capable of flexing inward and outward owing to the resilience of the material forming the chucking member 17. The distal end of the arm 17b is provided with a claw 17c for chucking and positioning the outer peripheral surface of the glass member 30, described below.

The intermediate portion of the arm 17b is formed to have a projection 17d, and the tip of the arm 17b is formed to have a projection 17e. The projection 17d abuts against a cam face 14d formed on the outer wall of the support member 14, and the projection 17e abuts against a slanted face 16g formed on the upper end of the frame 16.

Accordingly, by sliding the chucking member 17 up and down with respect to the support member 14 and the frame 16, the four arms 17b move along the cam face 14d and the slanted face 16g so that the claw portions 17c can be made to open and close. In other words, by sliding the chucking member 17 up and down, the glass member is chucked and unchucked.

The air cylinder 20 for moving the chucking member 17 up and down with respect to the support member 14 and frame 16 is secured beneath the base plate 10. The upper part of the air cylinder 20 has a cylinder rod 20b which moves relative to an air cylinder body 20a. A disk-shaped connecting member 22 for being connected to the support member 17 is attached to the top side of the cylinder rod 20b.

Connecting rods 24A, 24B and 24C (only 24C is not shown) are secured in an upright state to the top side of the connecting member 22 at three locations on the circumference thereof. The upper ends of the connecting rods 24A, 24B and 24C penetrate into the columnar cavity 16a via through-holes 10a, 10b, 10c (only 10c is not shown) formed in the base plate 10 and through-holes 16c, 16d, 16e (only 16e is not shown) formed at three locations in the bottom of the frame 16, respectively, and the connecting rods are connected to the fitting portion 17a on the lower side of the chucking member 17.

Compression springs 26A, 26B, 26C (only 26C is not shown) are disposed in a loosely fitted state on the connecting rods 24A, 24B, 24C, respectively, between the bottom side 10d of the base plate 10 and the top side of the connecting member 22. As a result, the connecting member 22 is urged downwardly away from the bottom side 10d of the base plate 10.

Figure 3:
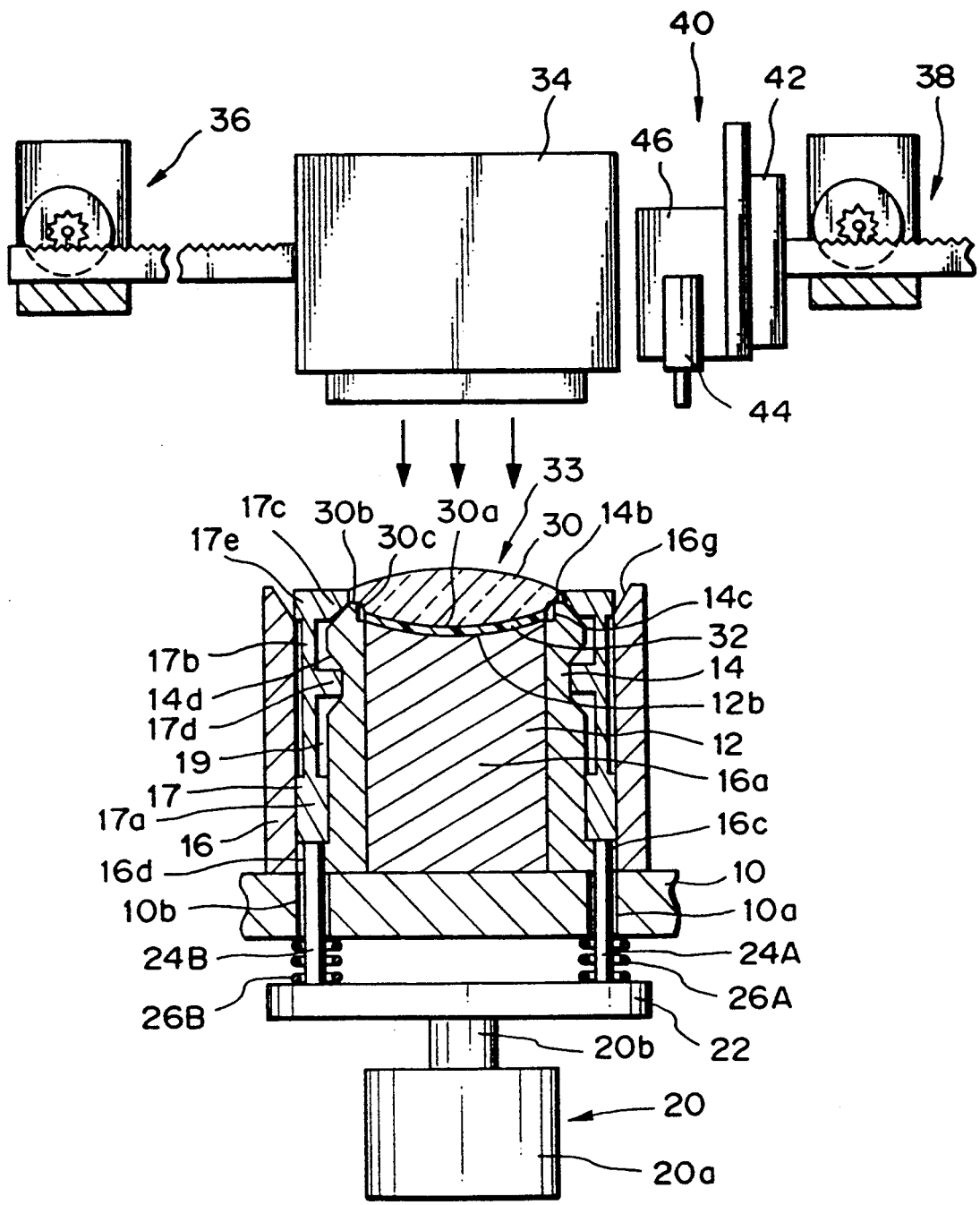
FIG. 3 is a diagram showing the molding apparatus of the first embodiment in a state where a support member of the apparatus has been released.

Accordingly, when the air cylinder 20 is in the deactuated state, the cylinder rod 20b and the connecting member 22 are urged downwardly under their own weight and by the biasing force of the compression springs 26A, 26B, 26C, and the chucking member 17 is situated on the lower side relative to the mold member and frame 16. Under these conditions, the four claws 17c of the chucking member 17 are closed, as shown in FIG. 3, so that the glass member 20 has its outer peripheral portion chucked by the four claws 17c.

In this state the glass member 30 is held by the chucking portion 17 in such a manner that the position of its optic axis accurately coincides with the center of the molding surface 12b of mold member 12.

When the air cylinder 20 is actuated to move the connecting member 22 to the upper side, the chucking member 17 is urged upward via the connecting rods, 24A, 24B and 24C. As a result, the four claws 17c of the chucking member 17 open, as depicted in FIG. 1, thereby releasing the glass member 30 from the chucked state.

Since the molding surface 12b of the mold member 12 has been worked to an aspherical shape required for the completed shape of the replica lens 33, the resin layer 32 to which the aspherical shape of the molding surface has been transferred can be formed on the surface of the glass member 30 by curing the resin, which has been charged into the space defined by the contact surface 30a of the glass member 30 and the molding surface 12b, in a state in which the glass member 30 has been placed upon the upper end face 14b of the mold member 14.

It will be understood from observing FIG. 1 that the amount of protrusion h of the support member 14 decides the thickness of the resin layer 32 formed on the glass member 30. Though the value of h differs depending upon the degree to which the molding surface 12b is aspherical, h is set to such a value that the thickness of the resin layer 32 will not fall below, say, 30 μm, at the location where the resin layer 32 is thinnest.

The upper end of the support member 14 is formed to have a relief 14c for accommodating a bulging portion of the resin material caused by overflow. This prevents overflowing resin material from attaching itself to the support member 14. It also prevents burrs from being formed by overflow of the resin material from the portion where the glass member 30 and the upper end face 14b of the support member 14 contact each other.

An irradiating apparatus 34 for emitting activating energy beams is arranged above the glass member 30. The resin layer 32 can be cured by irradiating it with the activating energy beams from the irradiating apparatus 34. The latter is supported on a transport mechanism 36 and is so adapted that it can be withdrawn from the optic axis of the glass member 30 when necessary.

In addition to the irradiating apparatus 34, an apparatus 40 for supplying the resin material is arranged above the glass member 30. The supply apparatus 40 is supported on a transport mechanism 38 capable of being moved between a position on the optic axis of the glass member 30 and a position remote therefrom. The supply apparatus 40 is equipped with an elevating mechanism 42 held by the transport mechanism 38, a syringe 44 supported on the elevating mechanism 42, and a drive unit 46 for driving a piston possessed by the syringe 44. The supply apparatus 40 is so adapted as to supply the molding surface 12b of the mold member 12 with a predetermined amount of resin material.

A procedure for molding and working the replica lens in the molding apparatus set forth above will now be described.

In connection with the molding of the replica lens 33, the air cylinder 20 is actuated to place the chucking member 17 in the open state shown in FIG. 1. The resin material is then supplied to the molding surface 12b of the mold member 12. FIG. 2 illustrates the procedure of the operation for supplying the resin material.

Figure 2A:
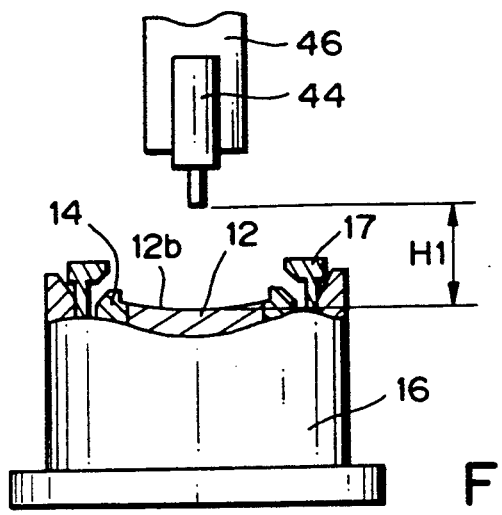
FIGS. 2(a)–2(e) represent a diagram showing the procedure of an operation for supplying a resin material.
Figure 2B:
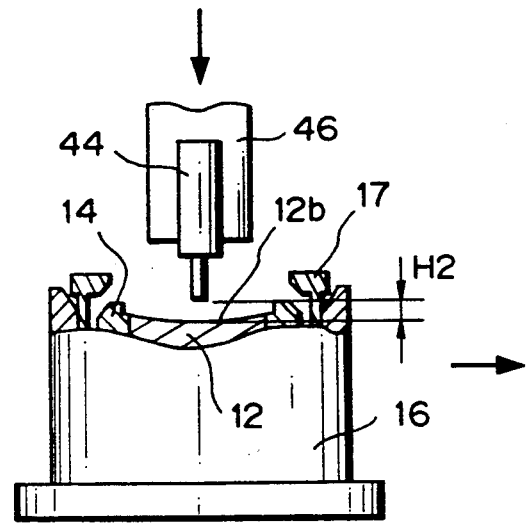
Figure 2C:
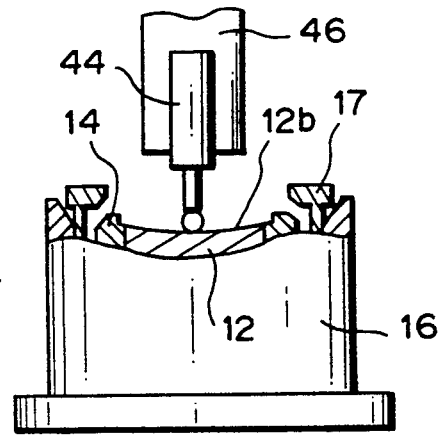
Figure 2D:
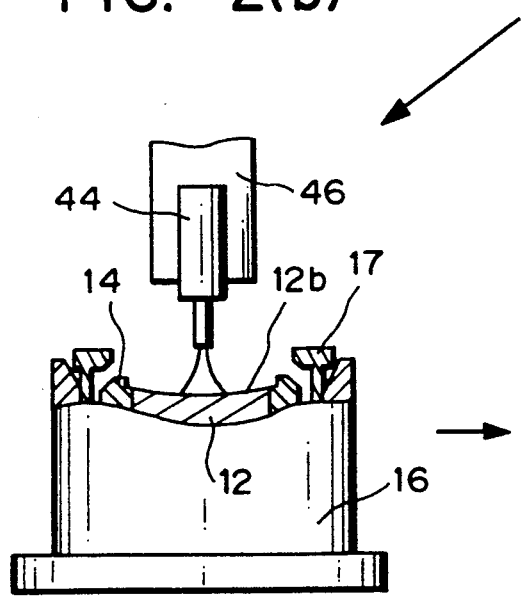

First, the transport mechanism 38 is actuated to position the supply apparatus 40 relative to the mold member 12 in such a manner that the tip of the syringe 44 is brought to the center of the molding surface 12b, as illustrated in FIG. 2(a). Next, the elevating mechanism 42 is actuated and lowered in such a manner that the syringe 44 is made to approach the molding surface 12b, as shown in FIG. 2(b). The elevating mechanism 42 is halted just before the tip of the syringe 44 contacts the molding surface 12b. Under these conditions, a resin material is discharged in small increments from the tip of the syringe 44, as depicted in FIG. 2(c). At the same time as discharge begins, or upon passage of a prescribed period of time from the start of discharge, the syringe 44 is slowly raised, as shown in FIG. 2(d). The operation for discharging the resin material continues even as the syringe 44 is being raised and is terminated when the amount of resin material supplied reaches a prescribed value. The rate at which the resin material is discharged and the speed at which the syringe 44 is raised are set in such a manner that there will be no interruption in the resin material between the molding surface 12b and the tip of the syringe 44 when the syringe 44 is being raised. When the syringe 44 has reached a predetermined height, the operation of the elevating mechanism 42 is terminated.

A specific example of the operation for supplying the resin material will be described. It will be assumed that the resin material used is of the type cured by ultraviolet radiation, namely a monomer of urethanated acrylate and acrylate, and that an aspherically shaped resin layer having a center thickness of 30 μm and a maximum thickness of 60 μm is molded on the surface of a glass lens having a diameter of 18 mm. In this case the volume of the resin material supplied will be $14 \times 10^{-3}$ cc.

First, in FIG. 2(a), the height, indicated by H1, of the tip of syringe 44 above the molding surface 12b is 100 mm. From this position, the syringe 44 is lowered at a speed V1=100 mm/sec and is stopped when its tip reaches a position having a height H2=1.1 mm from the molding surface 12b, as illustrated in FIG. 2(b).

Figure 2E:
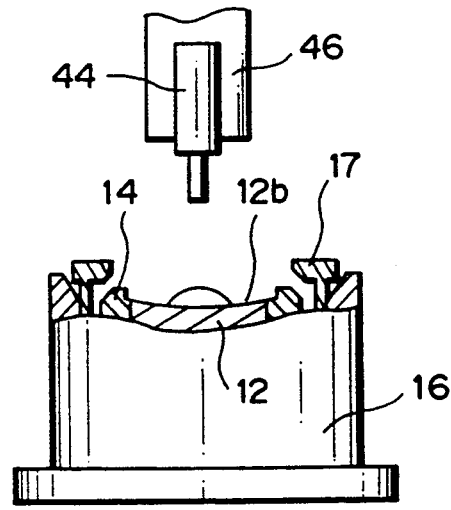

Next, in the state shown in FIG. 2(b), the resin material starts being discharged from the syringe 44 at a rate of $3.5 \times 10^{-3}$ cc/sec. When $3.5 \times 10^{-3}$ cc of the resin material has been discharged and the resin material contacts the molding surface 12b, as depicted in FIG. 2(c), the syringe 44 starts to be raised at a low speed, i.e., 0.2 mm/sec. As the syringe 44 is thus being raised, the resin material continues to be discharged, as illustrated in FIG. 2(d). Then, 4 sec after the start of resin discharge, the discharging operation is terminated. A suitable amount of the resin material, namely $14 \times 10^{-3}$ cc, is thus discharged. At this time the tip of the syringe 44 is at a height of 1.7 mm from the molding surface 12b, but the syringe 44 continues to be raised without interruption. When the tip of the syringe 44 reaches a position at a height of 6 mm from the molding surface 12b, the elevation operation is halted. Thereafter, as depicted in FIG. 2(e), the syringe 44 is raised at a high speed to return it to the same position as that shown in FIG. 2(a). Here the process for supplying the resin material is ended.

By supplying the resin material in accordance with the foregoing process, the following two effects are obtained:

(1) The resin material is not dropped onto the molding surface 12b from a position high above it. Rather, the resin material is allowed to contact the molding surface gently while in a generally spherical shape resulting from its surface tension. This makes it possible to prevent air bubbles from forming in the resin material owing to shock sustained by being dropped upon the molding surface.

(2) In a case where the resin material is discharged at a position close to the molding surface 12b, the surface tension of the resin material causes a ball of the resin material to form so as to envelope the tip of the syringe 44. As a consequence, the resin material attaches itself to the tip of the syringe 44 so that an accurate amount of the resin material cannot be supplied. By contrast, when the tip of the syringe 44 is raised as the resin material is being discharged, as in the above-described embodiment, the resin material no longer is capable of attaching itself to the syringe tip. This makes it possible to accurately regulate the amount of resin material supplied.

In connection with (1) above, the entrapment of air bubbles in the resin material is conceivable also in the process of placing the glass member 30 on the support member 14 after the resin material has been supplied. Accordingly, it is very important that these processes be managed so as to prevent the entrapment of air bubbles. Even if air bubbles are entrapped to a degree that will not affect the optical function of the lens, entrapped air bubbles that can be confirmed visually render the manufactured product unsuitable for shipping. Thus, managing this problem is an important factor in raising yield.

In connection with (2) above, the amount of resin material which fills the space between the contact surface 30a of the glass member 30 and the molding surface 12b is very small and therefore it is important that the amount of resin material be precisely regulated so that a fixed quantity is supplied. By adopting the method set forth above, the volume of the resin material supplied can be accurately controlled so as to be constant.

In a case where, by way of example, an arrangement is adopted for controlling the weight of the resin material at the time of supply, the volume of the resin material varies widely depending upon temperature and humidity, even if the weight of the resin material is constant. This makes it necessary to strictly manage temperature and humidity in order that the resin material will be delivered even to the corners of the space between the contact surface 30a and the molding surface 12b and without protruding from the space by a large amount. To this end, it is preferred that the amount of resin material supplied be controlled based upon volume.

When supply of the resin material ends, the moving mechanism 38 is actuated to retract the supply apparatus 40 from the optic axis of the glass member 30. Under these conditions, the glass member 30, whose contact surface 30a has been coated with a coupling agent so that the resin layer 32 will not readily peel off, is placed upon the upper end face 14b of the support member 14, as shown in FIG. 1. At this time the glass member 30 is placed upon the support member 14 very carefully so that the resin material will be delivered, without air bubbles being formed, into the space, including the corners thereof, defined by the contact surface 30a of the glass member 30 and the molding surface 12b of the mold member 12.

In actuality, it is not possible to control the amount of resin material so that it will fill the aforementioned space up to its corners with absolutely no protrusion of the resin material from the space. This means that a small amount of the resin material will protrude from the edge of the molding surface 12b. If the protruding resin material attaches itself to the rim portion 30b of the glass member 30, the completed replica lens 33 when incorporated in the lens barrel will be mounted in a tilted attitude relative to the optic axis of the lens barrel and the optical performance will decline as a result. Accordingly, the glass member 30 is provided with a relief portion 30c for the resin material at a position between the rim portion 30b and the part of the glass member outwardly of an effective diameter D of light rays (see FIG. 5). The relief portion 30c is formed by cutting into the glass member 30 to a depth below an extension of the contact surface 30a thereof so as to form a steep, upwardly directed inclined surface. Since the protruding resin material attempts to migrate downward in accordance with the force of gravity, the fact that the relief portion 30d is defined by the upwardly directed, steeply inclined surface prevents the resin material from flowing to the rim portion 30b.

Further, a relief portion 14c is formed on the upper end of the support member 14 so that the protruding resin material is prevented from attaching itself to the support member 14.

When the operation for placing the glass member 30 upon the support member 14 ends, the transport mechanism 36 is actuated to transport the irradiating apparatus 34 to the optic axis of the glass member 30. The resin material 32 is irradiated, through the glass member 30, with ultraviolet radiation serving as the aforementioned activating energy. As a result of irradiation, the resin layer 32 begins to harden.

In order to assure the optical performance of the completed replica lens, it is very important that the optic axis of the glass member 30 and the center of the molding surface 12b of mold member 12 be made to coincide. In order to accomplish this in accordance with the first embodiment of the invention, the glass member 30 is chucked by the chucking member 17, as described earlier, while the process for irradiating the resin material with ultraviolet radiation is in progress, thereby bring the centers of the glass member 30 and mold member 12 into agreement.

In addition to resins of the type which cure by ultraviolet radiation, even resins of the bonding-agent type generally undergo a contraction in volume at curing. More specifically, in a replica lens, the resin layer 32 contracts in the radial direction of the glass member 30. At such time, the resin layer 32, owing to slight differences in the degree of contraction of the resin layer 32 at various parts thereof, the resin layer 32 contracts not toward the central axis of the glass member 30 but about a position offset slightly from the central axis. As the resin layer 32 cures, therefore, a force which attempts to move the glass member 30 relative to the mold member 12 a very small distance in the radial direction of the mold member 12 acts upon the glass member 30. If the center of the glass member 30 chucked by the chucking member 17 and the center of the mold member 12 are held in agreement against the aforementioned force attempting to move the glass member 30, the resin layer 32 will peel off the glass member 30 or the molding surface 12a of the mold member 12. In order to solve this problem according to the first embodiment, it is so arranged that the glass member 30 chucked by the chucking member 17 is released again before the resin layer 32 cures completely.

Figure 4:
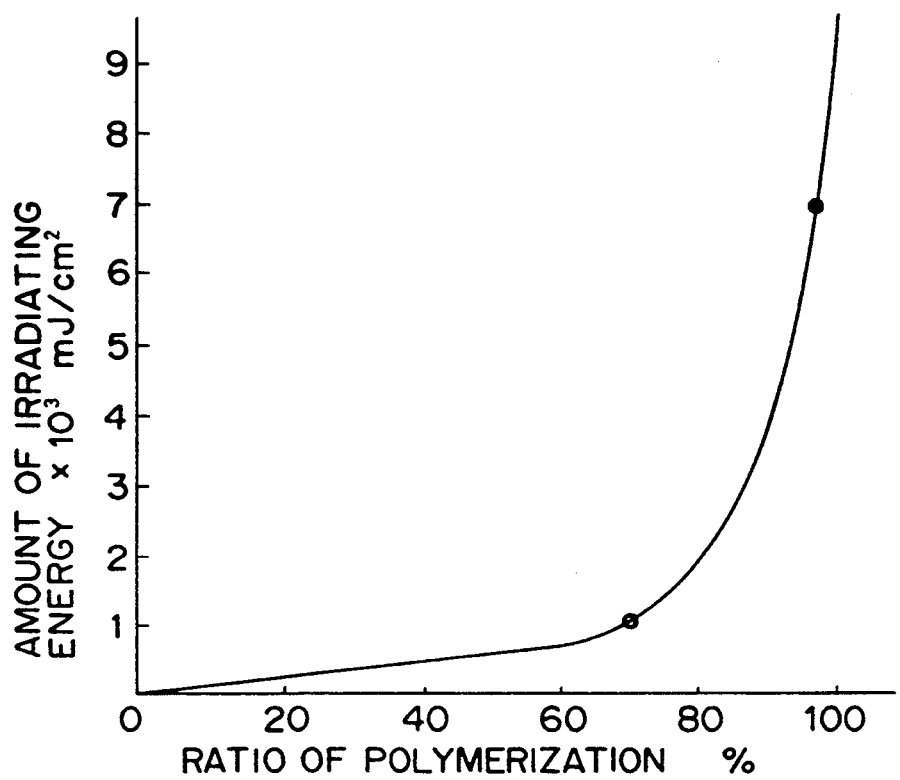
FIG. 4 is a diagram illustrating the relationship between an amount of irradiation energy and ratio of polymerization.

This will be described with regard to a specific example. In a case where the above-mentioned resin material of the type cured by ultraviolet radiation, namely the monomer of urethanated acrylate and acrylate, is used as the resin material, the resin layer 32 is irradiated with ultraviolet radiation, which has a center wavelength of 365 nm, for 30 seconds at an irradiation intensity of 30 mW/cm². The resin layer irradiated using a fluorescent lamp within the irradiating apparatus. The amount of irradiating energy per square centimeter by a first stage of irradiation is 30 mW×30 sec=900 mWs=900 mJ. The ratio of polymerization of the resin material is approximately 70%, as indicated by the white circle on the graph of FIG. 4, which illustrates the relationship between irradiating energy and ratio of polymerization. The viscosity of the resin material at this time is 1300~1700 cps. If the resin layer 32 has cured to a certain extent but an external force is still applied, the state which prevails is one in which the glass member 30 is capable of being moved relative to the mold member 12.

When the first stage of irradiation ends, the air cylinder 20 is deactuated and the outer peripheral portion of the glass member 30 is chucked by the chucking member 17 to accurately bring the position of the optic axis of glass member 30 into agreement with the position of the center of the molding surface 12b of mold member 12, as shown in FIG. 3. Thereafter, the resin layer 32 is again irradiated with ultraviolet radiation having the same center wavelength of 365 nm but for a period of 60 sec at an irradiation intensity of 100 mW/cm². This irradiating operation is performed by a high-voltage mercury-xenon lamp, which is one other light source within the irradiating apparatus 34. The amount of irradiating energy per square centimeter by this second stage of irradiation is 100 mW×60 sec=6000 mJ. The total amount (of the first and second stages) of irradiating energy is 6900 mJ. The ratio of polymerization corresponding to this amount of irradiating energy is on the order of 96%, as indicated by the black circle on the graph of FIG. 4. This represents substantially complete hardening of the resin material.

Twenty seconds after the start of the second stage of irradiation, namely when the total amount (of the first and second stages) of irradiating energy has become 100 mW×20 sec+900 mJ=2900 mJ, the glass member 30 is again unchucked by the chucking member 17, as shown in FIG. 1. The ratio of polymerization at this amount of irradiating energy is on the order of 85%. When the resin layer 32 has cured to a point at which the ratio of polymerization is 85%, the glass member 30 no longer moves owing to the flexibility of the resin layer 32. In the course of subsequent curing, the glass member 30 merely moves slightly relative to the mold member 12 in the radial direction thereof owing to slight differences in the degree of contraction of the resin layer 32 at various parts thereof. Since the amount of movement of the glass member 30 due to the contraction of the resin layer 32 is extremely small, it does not lead to a decline in the performance of the completed replica lens.

With regard to mutual centering of the glass member 30 and molding surface 12b, the resin material will still be in the liquid state in a case where the glass member 30 and the molding surface 12b have been centered before the resin material has cured at all, namely prior to the first stage of irradiation. Consequently, it is conceivable that the resin material which has attached itself to the surface of the glass member 30 will protrude in an irregular shape from the edge of the molding surface 12b when the glass member 30 moves. If the resin material is cured in this state, there is the danger that thin film-like burrs or that burrs having an irregular shape will result from the protruding resin material. In the first embodiment, therefore, the aforementioned centering operation is performed once the resin material has cured to a certain degree in order to assure that such burrs will not form.

It should be noted that the degree to which the resin material is cured by the first stage of irradiation is not limited to the example described above, for the degree of curing may be changed to a value somewhat higher or lower than that mentioned in the foregoing example. In addition, if the problem of burrs can be solved, it is permissible to carry out the centering operation even with the resin material in a completed uncured state. In actuality, it is possible to perform centering if the viscosity of the resin material is in the range $10^0 \sim 10^6$ cps.

Figure 5:
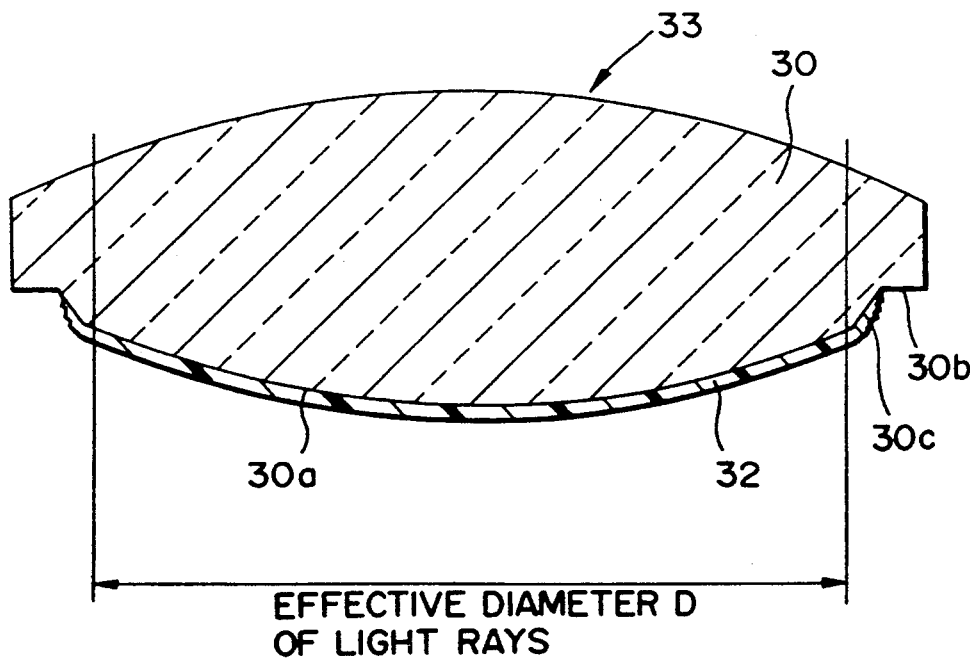
FIG. 5 is a diagram showing the shape of a completed replica lens having a convex surface.

The replica lens 33 whose resin layer 32 has thus been completed cured is separated from the mold member 12, and a prescribed coating (a non-reflective coating, for example) is applied to the upper and lower surfaces of the lens, whereby the replica lens 33 is completed. FIG. 5 is a drawing the shape of the complicated replica lens 33.

Next, another example of the first embodiment will be described below.

The resin material employed here is a liquified compound of urethanated polyesteracrylate of 38 wt %, ditrimethylolpropane-tetraacrylate of 35 wt %, isobornylacrylate of 25 wt % and 1-hydroxycyclohexylphenylketone of 2 wt % which has a faster curing speed than that used in the first example in this embodiment. The molding apparatus and the mold member are the same as those shown in FIG. 1.

First, the resin layer 32 is irradiated with ultraviolet radiation having the center wavelength of 365 nm for a period of 10 second at an irradiation intensity of 2 mW/cm². The irradiating operation is performed by the fluorescent lamp in the irradiating apparatus 34. The amount of irradiating energy per square centimeter by this first stage of irradiation is 2 mW×10 sec=20 mWs=20 mJ. The ratio of polymerization of the resin material is about 90% and the viscosity of the resin layer is 50000 cps. The resin layer 32 will have been hardened to a certain degree by this time, however, it is possible for the glass member 30 to be moved with respect to the mold member 12 if an external force is applied.

When this first stage of irradiation ends, the air cylinder 20 is deactuated and the outer peripheral portion of the glass member 30 is chucked by the chucking member 17 to accurately bring the position of the optic axis of glass member 30 into agreement with the position of the center of the molding surface 12b of the mold member 12 as shown in FIG. 3. Thereafter, the resin layer 32 is again irradiated with ultraviolet radiation having the same center wavelength of 365 nm for 20 second at an irradiation intensity of 100 mW/cm². This irradiating operation is performed by the high-voltage mercury-xenon lamp, one other light source within the irradiating apparatus 34. The amount of irradiating energy per square centimeter by this second stage of irradiation is 100 mW×20 sec=2000 mJ. The total amount (first and second stages) of irradiating energy is 2020 mJ. The ratio of polymerization corresponding to this amount of irradiating energy is about 97%, representing substantially complete hardening of the resin material.

Five seconds after the start of the second stage of irradiation, namely when the total amount (of the first and second stages) of irradiating energy has become 100 mW×5 sec+20 mJ=520 mJ, the glass member 30 is again unchucked by the chucking member 17, as shown in FIG. 1. The ratio of polymerization at this amount of irradiating energy is on the order of 95%. When the resin layer 32 has cured to a point at which the ratio of polymerization is 95%, the glass member 30 no longer moves owing to the flexibility of the resin layer 32. In the course of subsequent curing, the glass member 30 merely moves slightly relative to the mold member 12 in the radial direction thereof owing to slight differences in the degree of contraction of the resin layer 32 at various parts thereof. Since the amount of movement of the glass member 30 due to the contraction of the resin layer 32 is extremely small, it does not lead to a decline in the performance of the completed replica lens.

According to this example, the irradiation time in the first irradiation stage is 10 sec and that in the second irradiation stage is 20 sec. The total irradiation time 30 sec is short enough to minimize molding time, thus improving productivity.

Further, the resin material after the first irradiation has a comparatively high viscosity of 10000~100000 cps, which prevents irregular protruding of the resin material in moving of the glass member 30.

Figure 6:
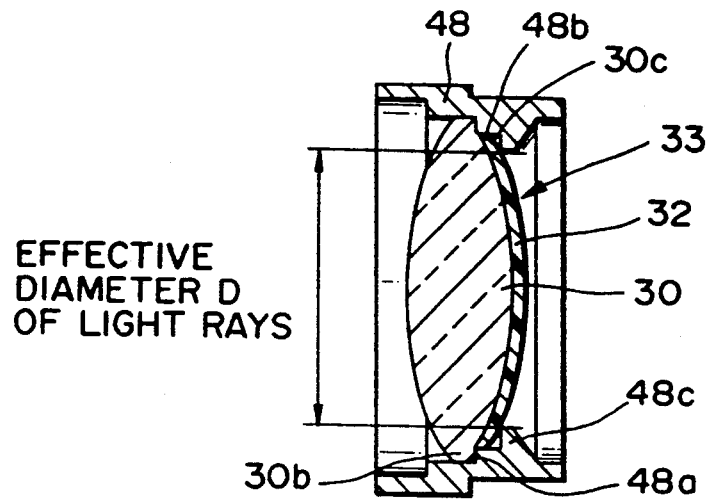
FIG. 6 is a diagram showing an example of a lens barrel in which the replica lens of FIG. 5 has been mounted.

FIG. 6 illustrates a example of a lens barrel in which the replica lens is mounted.

As shown in FIG. 6, a lens barrel 48 is provided with a positioning portion 48a for setting the position of the center of the replica lens 33 as well as its position along the optic axis by abutting against the rim portion 30b of the lens. The lens barrel 48 is further provided with a relief portion 48b for accommodating the resin material protruding from the resin relief portion 30c of the replica lens 33. The lens barrel 48 also includes a light-shielding portion 48c on the light-incident side, namely in front of the replica lens 33. The light-shielding portion 48c has an inner diameter slightly larger than the effective diameter of entrant light rays and therefore prevents the light rays from impinging upon the portion of the resin protruding from the relief portion 30c.

By thus providing the lens barrel 48 with the relief portion 48b for receiving the bulging portion of the resin material and with the light-shielding portion 48c on the light-entrant side, the replica lens 33 can be positioned accurately with respect to the lens barrel 48. Moreover, it is possible to prevent undesirable phenomena such as diffuse reflection and irregular refraction of light rays caused by the light rays impinging upon the bulging portion of the resin material, which has an irregular surface shape. As a result, a deterioration in image quality can be prevented.

In the foregoing embodiment, a case is described in which a replica lens having a convex surface is molded. However, it is possible to apply the method of molding an optical element according to the first embodiment in exactly the same manner also in a case where a replica lens having a concave surface is molded.

Figure 7:
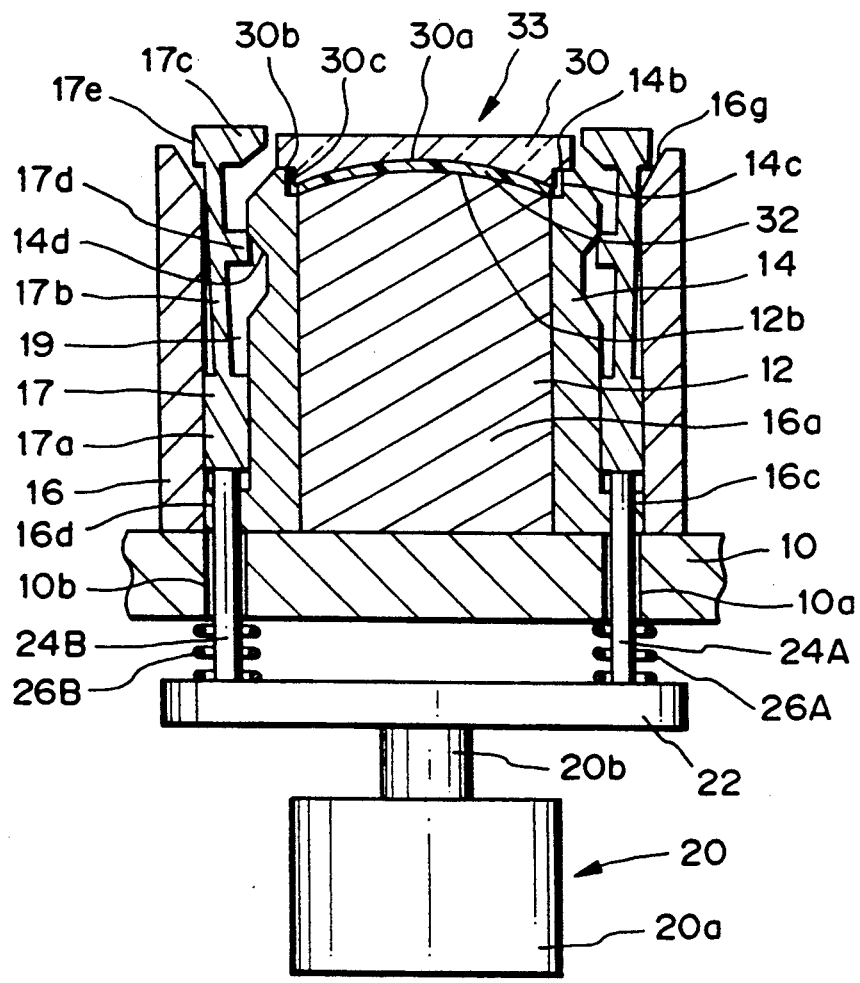
FIG. 7 is a diagram showing the construction of an apparatus for molding a replica lens having a concave surface.

FIG. 7 illustrates a molding apparatus for a case where the replica lens having a concave surface is molded. This apparatus can be realized merely by substituting a mold member corresponding to the concave surface for the mold member 12 in the molding apparatus of FIG. 1. Other structural components and the molding operation are exactly the same as in the molding apparatus shown in FIG. 1.

Figure 8:
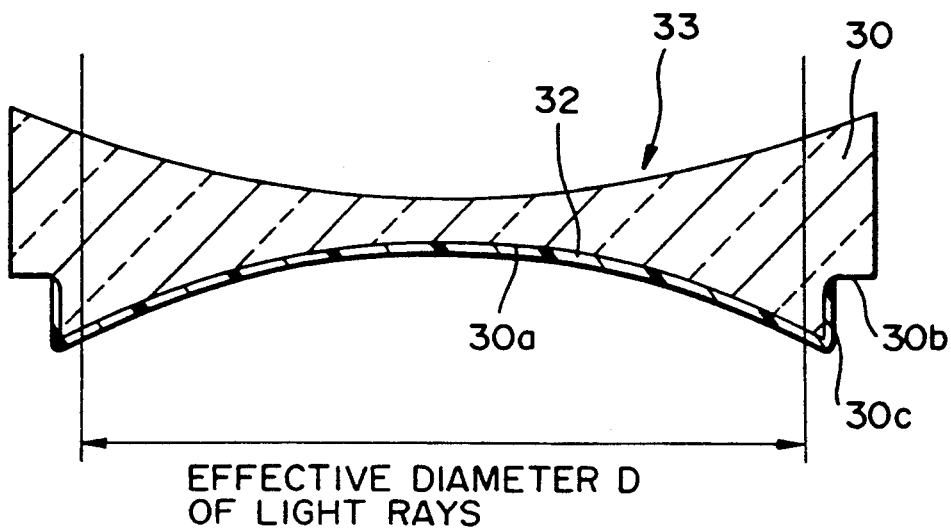
FIG. 8 is a diagram showing the shape of a completed replica lens having a concave surface.

FIG. 8 illustrates the completed shape of the replica lens having a concave surface. As in the replica lens having the convex surface, this lens also has the rim portion and the relief portion for the resin material.

Figure 9:
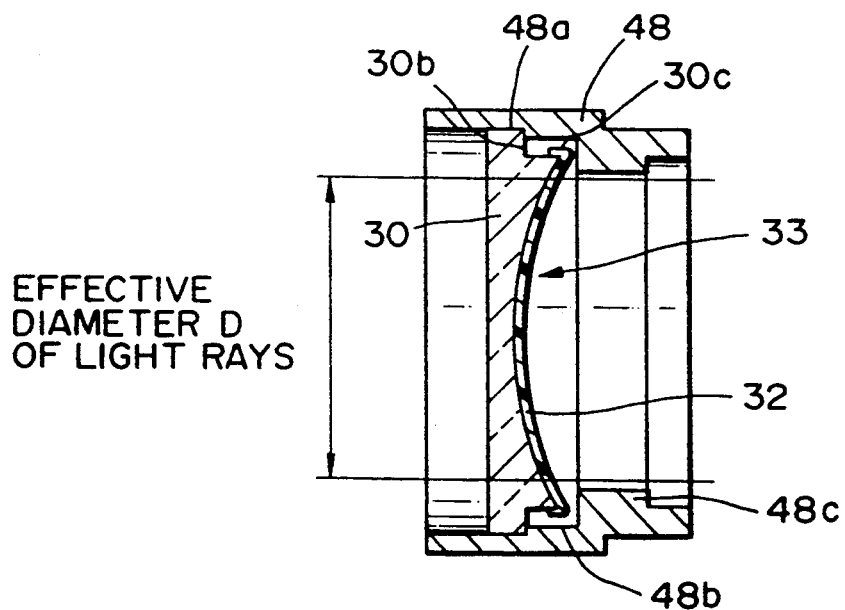
FIG. 9 is a diagram showing an example of a lens barrel in which the replica lens of FIG. 8 has been mounted.

FIG. 9 is a diagram depicting a lens barrel in which the replica lens having the concave surface is mounted. The lens barrel has the positioning portion for positioning the replica lens 33, the relief portion for accommodating the protruding resin material, and the light-shielding portion for preventing light from impinging upon the protruding portion of the resin material. This is exactly the same as in the lens barrel 48 shown in FIG. 6.

As for such conditions as the discharge rate of the resin material and the speed at which the syringe is moved when the resin material is supplied to the mold member, as well as such conditions as the irradiation intensity and irradiation time when the resin material is irradiated with the ultraviolet radiation, one ideal example is pointed out in the embodiment described above. However, the invention is not limited to the conditions illustrated in the above-described embodiment.

Though a case has been described in which a resin curable by ultraviolet rays is used as the resin curable by activating energy, the resin used can be of the type cured by X rays or infrared rays.

It has been set forth above that the glass member is placed upon the support member after the resin material is supplied to the mold member. However, if the mold member is provided with a hole for supplying the resin material, the resin material can be supplied to the space between the glass member and the mold member after the glass member is placed upon the support member.

Further, an arrangement may be adopted in which the resin is supplied to the glass member and not the frame member, after which the glass member so supplied with the resin is placed upon the support member.

Furthermore, though the case described above relates to formation of a replica lens, the method of molding an optical element according to this embodiment can be applied in a similar manner to other types of optical elements so long as a resin film is formed on the surface of a glass material.

In the case described above, an air cylinder and springs are employed in order to raise and lower the support member. However, it goes without saying that these can readily be replaced by an elevating mechanism which is a combination of a ball screw and a stepping motor or DC servomotor, etc.

Thus, in accordance with the method and apparatus for molding optical elements according to the first embodiment, as described above, the glass member is positioned in such a manner that its central axis accurately coincides with the central axis of the molding surface when the viscosity of the resin layer resided within a prescribed range. Then, before the resin material is completed cured, the glass member is released from the positioned state. As a result, peeling of the resin layer can be prevented while at the same time it is possible to accurately bring the central axis of the glass member and the central axis of the molding surface into alignment.

Second Embodiment

Figure 10:
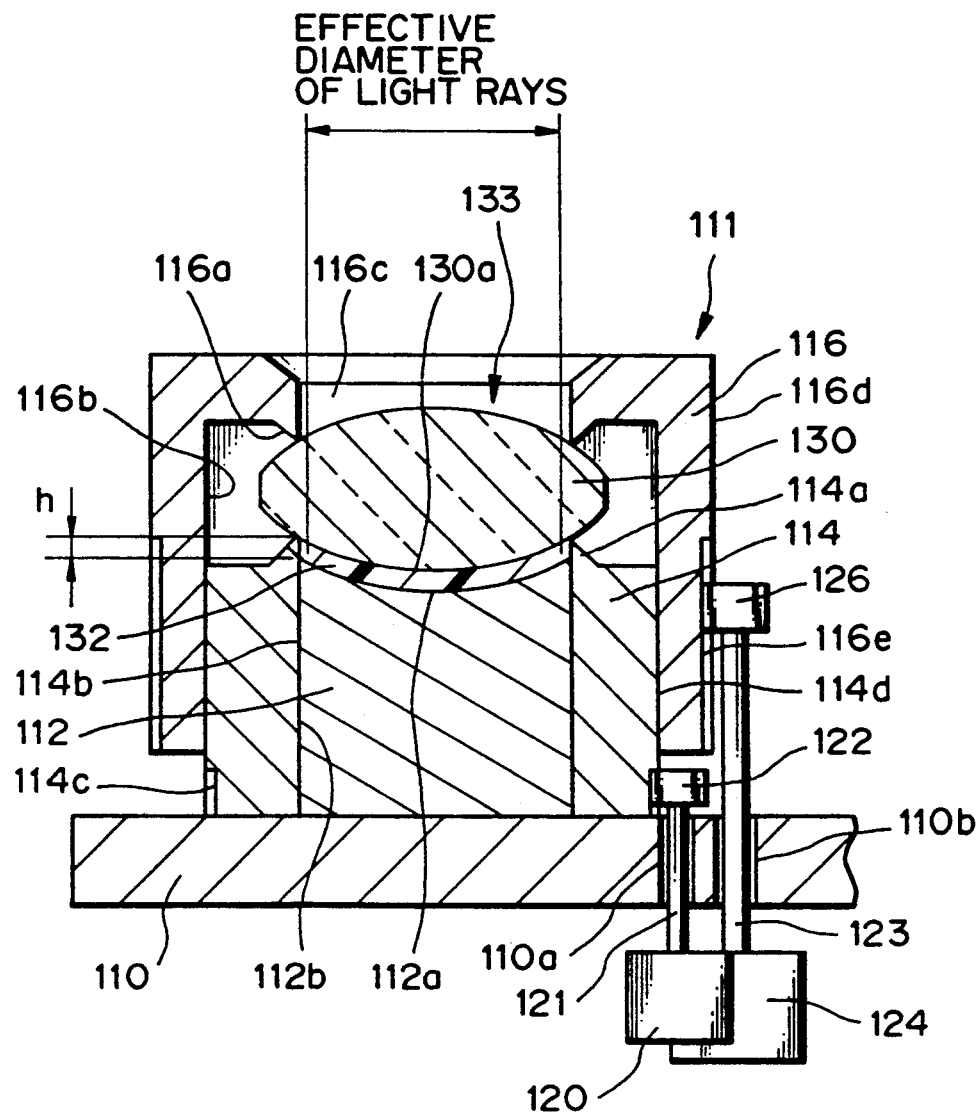
FIG. 10 is a diagram illustrating the construction of an apparatus for molding optical elements according to a second embodiment of the present invention.

FIG. 10 is a diagram showing the structure of an apparatus for molding optical elements according to a second embodiment of the present invention.

As shown in FIG. 10, a lens element 133 consists of an aspherical resin layer 132 formed on a contact surface 130a of a glass member 130 both of whose surfaces have been worked to convex spherical shapes. Such a lens element is referred to as a replica lens. Here the resin layer 132 is a material of the type curable by activating energy.

A mold 111 for molding the lens element 133 is placed upon a supporting base plate 110, which is supported in a horizontally extending state on the main body of a manufacturing apparatus (not shown) for manufacturing the lens element 133. More specifically, a generally columnar mold member 112 constituting the principal portion of the mold 111 is secured on the supporting base plate 110 in such a manner that the central axis of the mold member is directed along a vertical line. A molding surface 112a for transferring a predetermined aspherical shape to the surface of the resin layer 132 is formed on the upper end face of the mold member 112.

A generally columnar support member 114 having an inner peripheral surface 114b which mates with an outer peripheral surface 112b of the mold member 112 is fitted onto the outer side of the mold member 112. With the inner peripheral surface 114b thus mated with the outer peripheral surface 112b of the mold member 112, the support member 114 is capable of turning relative to the mold member 112 about the optic axis (an axis passing through the center of the molding surface 112a and perpendicularly intersecting the molding surface 112a) of the molding surface 112a.

A support portion 114a, which is for supporting the member 130 in a state in which its contact surface 130a is spaced away from the molding surface 112a of the mold member 112 by a distance which decides the thickness of the resin layer 132, is formed on the upper portion of the support member 114 so as to protrude circumferentially. The upper end of the support portion 114a has been worked to have the shape of a knife edge. The arrangement is such that when the support member 114 is rotated about the mold member 112 by a rotational drive motor 120, described later, there is a reduction in a force of resistance, namely a force which resists the rotation of the support member 114 relative to the glass member 130.

The support member 114a protrudes by an amount h from the edge portion of a molding surface 112a of mold member 112. The thickness of the resin layer 132 is decided by the amount of protrusion h. Though the value of h differs depending upon the degree to which the molding surface 112a is aspherical, h is set to such a value that the thickness of the resin layer 132 will not fall below a predetermined value (e.g., 30 μm) at the location where the resin layer 132 is thinnest. The lower portion of the support member 114 at the outer peripheral surface 114b thereof is formed to have a gear portion 114c which encircles the support member 114. The aforementioned rotational drive motor 120 is secured to the bottom side of the supporting base plate 110 by a fixing member, which is not shown. The rotational drive motor 120 has a rotary shaft 121 which projects from the top side of the supporting base plate 110 via a through-hole 110a formed in the base plate 110. A gear 122 is coaxially attached to the rotary shaft 121 and meshes with the gear portion 114c of the support member 114. Accordingly, rotating the drive motor 120 causes the support member 114 to rotate relative to the mold member 112 about the optic axis of the molding surface 112a.

A cylindrical cover 116 the upper end of which is sealed and which has an inner circumferential surface 116b for mating with the outer peripheral surface 114c of the support member 114 is fitted onto the outer side of the support member 114. With its inner circumferential surface 116b mated with the outer peripheral surface 114b of the support member 114, the cover 116 is capable of rotating relative to the support member 114 about the central axis (which is aligned with the optic axis of the molding surface 112a) of the support member 114, and of sliding in the axial direction.

The top side of the cover 116 is formed to have a circular hole 116c concentric with the inner resin layer 132 is irradiated with the activating energy through the hole 116c. The lower end of the hole 116c at the inner circumferential surface thereof is formed to have a clamp portion 116a for clamping the glass member 130 onto the support portion 114a by abutting against the upper surface of the glass member 120 on the part thereof outside the effective diameter of incident light rays. The lower end of the clamp portion 116a is formed to have a knife-edged shaped in a manner similar to the upper end of the support portion 114a. When the cover 116 is rotated about the support member 114 by a rotational drive motor 124, described later, there is a reduction in a force of resistance, namely a force which resists the rotation of the cover 116 relative to the glass member 130.

The lower portion of the cover 116 at the outer circumferential surface 116d thereof is formed to have a gear portion 116e which encircles the cover 116. The aforementioned rotational drive motor 124 is secured to the bottom side of the supporting base plate 110 by a fixing member, which is not shown. The rotational drive motor 124 has a rotary shaft 123 which projects from the top side of the supporting base plate 110 via a throughhole 110b formed in the base plate 110. A gear 126 is coaxially attached to the rotary shaft 123 and meshes with the gear portion 116e of the cover 116. Accordingly, rotating the drive motor 124 causes the cover 116 to rotate relative to the support member 114 about the optic axis of the molding surface 112a.

The procedure for molding the lens element 133 by the molding apparatus constructed as set forth above will now be described with reference to FIGS. 10 through 12.

First, in FIG. 10, the mold member 112 is supplied with the resin material in a state in which the cover 116 and glass member 130 have been detached from the support member 114. The resin material supplied is of the type curable by activating energy. In particular, a resin of the type curable by ultraviolet rays (namely a resin whose monomer component is urethanated acrylate and acrylate) is known as being an activating-energy curable resin material suitable for molding the lens element 33.

Next, the glass member 130 is placed upon the support member 114, in which state the contact surface 130a of the glass member 130 is in abutting contact with the upper end of the support portion 114a of support member 114. Under these conditions, the glass member 130 will be positioned substantially accurately with respect to the mold member 112 in the direction along the optic axis, but it may be somewhat tilted in the direction perpendicular to the optic axis. As a consequence, the optic axis of the glass member 130 may not be aligned with the optic axis of the molding surface 112a very accurately.

When the glass member 130 is placed upon the support member 114, the contact surface 130a of the glass member 130 flattens the resin material over the entirety of the molding surface 112a. In the process for placing the glass member upon the support member, care must be taken to assure that air bubbles do not become entrapped in the resin material.

When the process for placing the glass member 130 upon the support member 114 ends, the cover 116 is then attached in such a manner that its inner circumferential surface 116b is mated with the outer peripheral surface 114b of the support member 114. At this time the clamp portion 16a formed on the underside of the roof of cover 116 abuts, owing to its own weight (its dead load), against the top side of the glass member 130 to clamp the glass member 130 onto the support portion 114a. With the cover 116 thus fitted on the support member 114, the glass member 130 is embraced by the support portion 114a of the support member 114 and the clamp portion 116a of the cover 116. Since the top and bottom surface of the glass member 130 have been worked to a spherical shape, a centripetal force conforming to the the sizes of the radii of curvature of these spherical surfaces acts upon the glass member 130, and the optic axis of the glass member 130 coincides with the optic axis of the molding surface 112a to a fairly accurate extent.

However, if the radii of curvature of both surface of the glass member 130 are large, the frictional force between the upper end of the support portion 114a and the bottom side of the glass member 130 and the frictional force between the top side of the glass member 130 and the lower end face of the clamp portion 116a become larger than the centripetal force and there are instances where the optic axis of the glass member 130 may not align accurately with the optic axis of the molding surface 112a.

Figure 11:
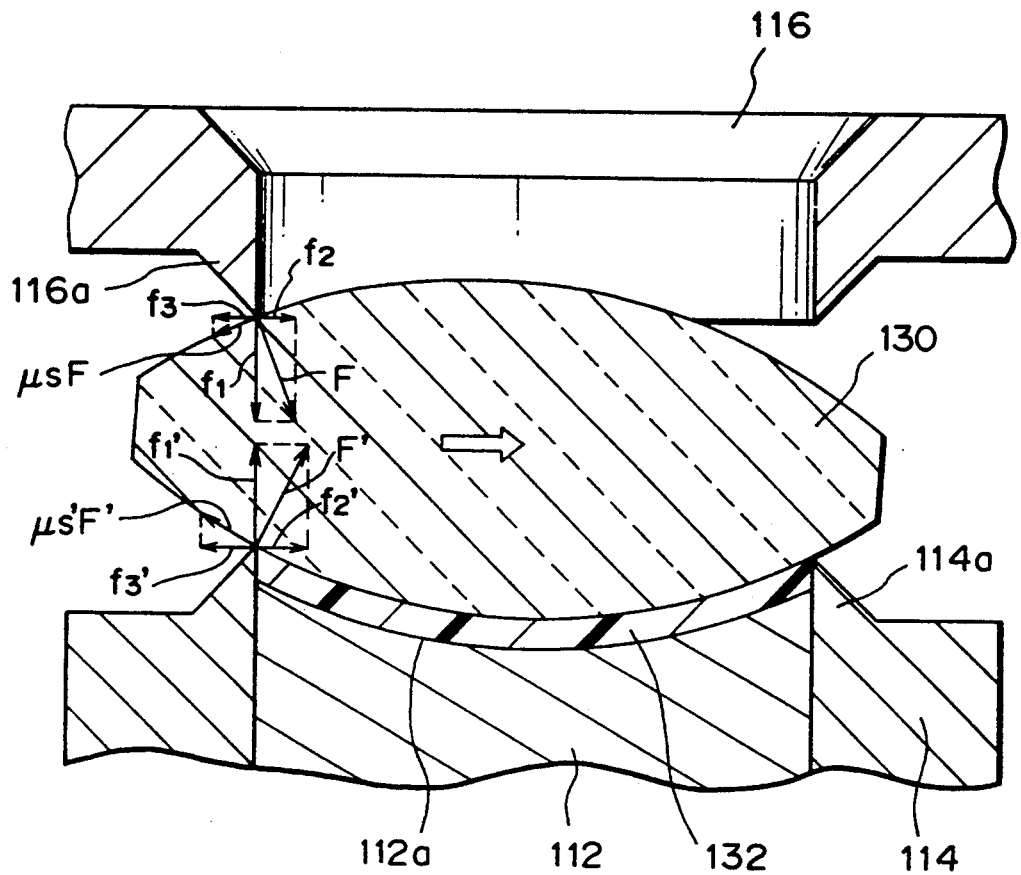
FIG. 11 is a diagram showing a state in which the optic axis of a glass member and the optic axis of a molding surface are not aligned.
Figure 12:
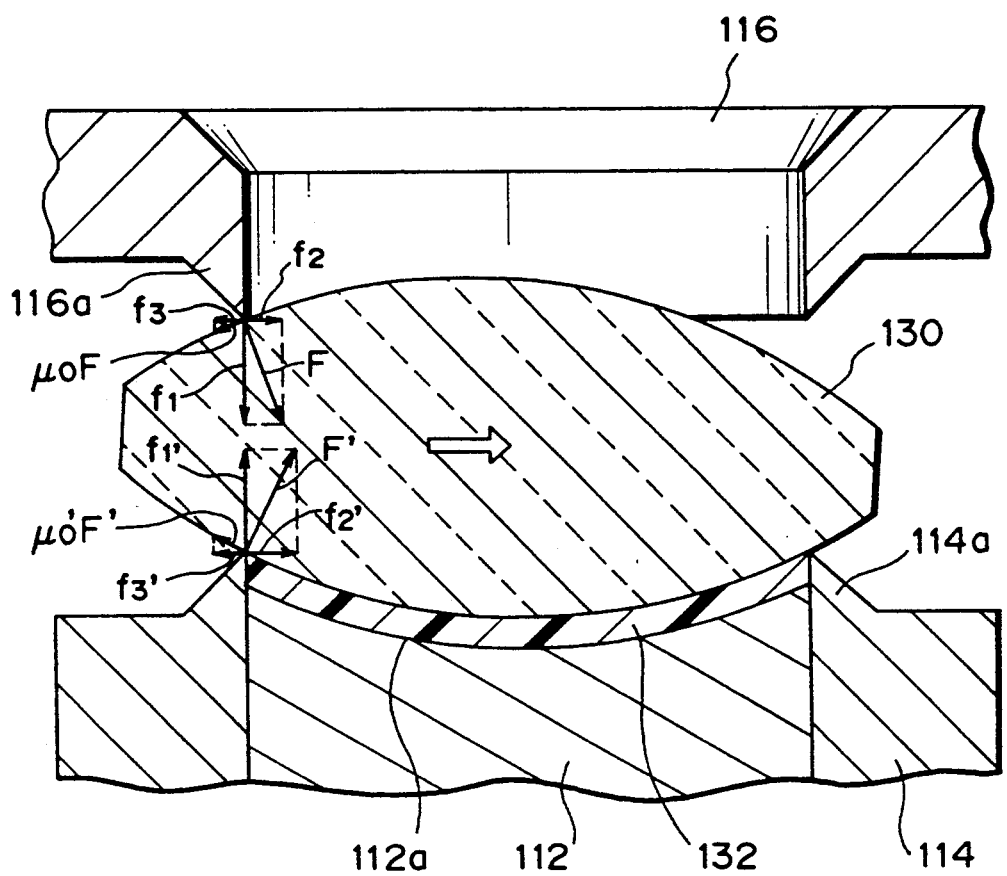
FIG. 12 is a diagram showing a state in which a static frictional force changes to a dynamic frictional force.

FIG. 11 is a diagram illustrating a state in which the optic axis of the glass member 130 and the optic axis of the molding surface 112a are not in alignment. In FIG. 11, the top side of the glass member 130 is subjected to a force F, which results from the weight (the dead load) of the cover 116, in a direction which perpendicularly intersects the tangent to the top side of the glass member 130. A vertically directed component of the force F is represented by $f_1$. The force component $f_1$ substantially coincides with the dead load of the cover 116. A horizontally directed component of the force F is represented by $f_2$. This force component acts as a force which attempts to move the glass member 130 in the direction indicated by the white arrow, namely a centripetal force which attempts to align the optic axis of the glass member 130 with the optic axis of the molding surface 112a. Further, a static frictional force $\mu_s F$ acts upon the top side of the glass member 130 in the tangential direction thereof, where $\mu_s$ represents the static coefficient of friction between the lower end of the clamp portion 116a of cover 116 and the top side of the glass member 130. The horizontal component of the static frictional force $\mu_s F$ is represented by $f_3$, which acts so as to hinder movement of the glass member 130 in the direction of the white arrow.

Meanwhile, the bottom side of the glass member 130 is acted upon by the dead load of the cover 116 and is subjected to a force F', in a direction perpendicular to the tangent of this side, which is a reaction force opposing the dead load of the glass member 130, as illustrated in FIG. 11. The vertically directed component of the force F' is represented by $f_1'$. If the dead load of the glass member 130 is assumed to be negligible in comparison with the dead load of the cover 116, then the relation $f_1' = f_1$ will hold. The horizontal component of the force F' is represented by $f_2'$. This force component acts as a force, namely a centripetal force, which attempts to move the glass member 130 in the direction of the white arrow, in the same manner that the force component $f_2$ acts upon the top side of the glass member 130. A static frictional force $\mu_s' F'$ acts upon the bottom side of the glass member 130 in the tangential direction thereof, where $\mu_s'$ represents the static coefficient of friction between the upper end of the support portion 114a of support member 114 and the bottom side of the glass member 130. The horizontal component of the static frictional force $\mu_s' F'$ is represented by $f_3'$, which acts so as to hinder movement of the glass member 130 in the direction of the white arrow.

The magnitudes of the centripetal force components $f_2$, $f_2'$ are dependent upon the dead load of the cover 116 and the radii of curvature of the surfaces of glass member 130. However, since the dead load of the cover 116 is constant, in effect these centripetal forces are decided solely by the sizes of the radii of curvature of the surfaces of glass member 130.

The magnitudes of the static frictional force components $f_3$, $f_3'$ which hinder centripetal movement of the glass member 130 are dependent upon the dead load of the cover 116 and the static coefficients of friction $\mu_s$, $\mu_s'$. However, since the dead load of the cover 116 is constant, as mentioned above, in effect these static frictional forces are decided solely by the magnitudes of the static coefficients of friction $\mu_s$, $\mu_s'$.

Accordingly, if the radii of curvature of the surfaces of the glass member 130 are large, the static frictional forces $f_3$, $f_3'$ become larger than the centripetal forces $f_2$, $f_2'$ and the glass member 130 is halted with its optic axis offset from the optic axis of the molding surface 112a, as illustrated in FIG. 11.

In order to avoid this situation and accurately align the optic axis of the glass member 130 with the optic axis of the molding surface 112a, in the next step of the process the rotational drive motors 120, 124 are actuated with the cover 116 attached to the support member 114, thereby rotating the support member 114 and the cover 116 about the optic axis of the molding surface 112a of the mold member 112. The support member 114 and cover 116 are rotated in mutually opposing directions.

If the support member 114 supporting the glass member 130 and the cover 116 are rotated relative to each other in this manner, sliding occurs between the top side of the glass member 130 and the clamp portion 116a as well as between the bottom side of the glass member 130 and the support portion 114a. Owing to this sliding motion, the static frictional forces $f_3$, $f_3'$ that until now have acted upon the glass member 130 change to dynamic frictional forces, which are a fraction of these static frictional forces (dynamic frictional coefficients are a fraction of static frictional coefficients, as is well known), as shown in FIG. 12. The glass member 130 readily moves in response also to these smaller centripetal forces $f_2$, $f_2'$ in the direction in which these centripetal forces act (the direction of the white arrow in FIG. 12). As a result, if the radii of curvature of the surfaces of the glass member 130 are large, the optic axis of the glass member 130 can be accurately aligned with the optic axis of the molding surface 112a. If this arrangement is adopted, the optic axis of the glass member 130 can be more accurately aligned with the optic axis of the molding surface 112a not only when the radii of curvature of the surfaces of the glass member 130 are large but also when they are small.

When the process for centering the glass member 130 ends, the resin material is irradiated with the activating energy through the hole 116c formed in the cover 116, which is the state illustrated in FIG. 10, whereby the resin material is cured. In the case where the resin used is of the type cured by ultraviolet rays, it goes without saying that ultraviolet rays are used as the activating energy rays. When the resin layer 132 has cured completely, the lens element 133 is released from the mold 111, thereby completing the lens element 133.

In the embodiment described above, the support member and the cover are rotated in mutually opposing directions. However, it is permissible to rotate the support member and cover in the same direction but at different speeds. Further, an arrangement can be adopted in which either the support member or cover is held fixed while only the other of these members is rotated.

Further, it is described above that the glass member is centered before the resin material is irradiated with the activating energy. However, it is permissible to perform centering after the resin material has cured to a certain extent. In such case, centering essentially can be carried out if the viscosity of the resin material is in the range $10^0 \sim 10^6$ cps.

Molding of a lens element having a convex surface is described above. However, the method of molding optical elements according to this embodiment is capable of being applied in exactly the same manner to a case where a lens element having a concave surface is molded. In such case, it will suffice to replace the mold member shown in FIG. 10 with a mold member having a shape which corresponds to the concave surface.

Though a case has been described in which a resin curable by ultraviolet rays is used as the resin curable by activating energy, the resin used can be of the type cured by X rays or infrared rays.

Thus, in accordance with the method and apparatus for molding optical elements according to the second embodiment, as described above, the support member for supporting the glass member with respect to the mold member and the cover having the clamp portion for clamping the glass member onto the support member are rotated relative to each other, as a result of which the glass member readily moves in the centripetal direction in response to centripetal forces. This makes it possible to accurately align the optic axis of the mold member and the optic axis of the molding surface.

The present invention is not limited to the above embodiments and various changes and modifications can be made within the spirit and scope of the present invention. Therefore, to apprise the public of the scope of the present invention, the following claims are made.

What is claimed is:

1. A glass member positioning method in an optical-element molding method for forming an optical element in which a glass material and a resin material are integrated, said molding method including the steps of supplying the resin material, which is a type cured by an activating energy beam, to a molding member having a molding surface, which functions to transfer an optical surface onto a surface of the resin material, and forming a resin layer made of the resin material on the surface of the glass member, said glass member positioning method comprising:

a first step of placing the glass member upon a support portion for supporting said glass member in a state in which a lower surface of said glass member is spaced away from a molding surface by a distance which determines the thickness of the resin layer;

a second step of positioning the glass member, relative to said molding member, at a predetermined position in a direction along a surface approximately parallel to the molding surface when the resin material, which has been charged into a space defined by said molding surface and the lower surface of said glass member, exhibits a viscosity within a predetermined range;

a third step of holding the glass member at said predetermined position until the resin material cures to a predetermined degree of polymerization; and a fourth step of releasing said glass member from a first state where said glass member is held at said predetermined position after said resin material has cured to said predetermined degree of polymerization.

2. The method according to claim 1, wherein, in said second step, said glass member is positioned when the viscosity of said resin material is in a range of $10^0 \sim 10^6$ cps.

3. The method according to claim 1, wherein said second step includes moving a positioning member, which is slidably fitted onto an outer peripheral surface of said support portion, in an axial direction, whereby the glass member is subjected to a centripetal action toward the central axis of said molding surface and an outer periphery of said glass member is chucked so that the central axis of said mold member is positioned so as to be aligned with the central axis of said molding surface.

4. The method according to claim 1, wherein, in said fourth step, said glass member is released from the first state when said resin material has cured to a degree of polymerization in the vicinity of 80-95%.

5. A glass member positioning method in an optical-element molding method for forming an optical element in which a glass material and a resin material are integrated, said molding method including the steps of supplying the resin material, which is a type cured by an activating energy beam, to a molding member having a molding surface, which functions to transfer an optical function surface onto a surface of the resin material, and forming a resin layer made of the resin material on the surface of the glass member, said glass member positioning method comprising:

a first step of placing the glass member upon a support portion for abutting against an outer peripheral portion of the first surface of said glass member and supporting said glass member in a state in which said first surface thereof is spaced away from a molding surface by a distance which determines the thickness of the resin layer;

a second step of mounting a cover on the support portion, wherein said cover has a clamp portion for abutting against an outer peripheral portion of a second surface of said glass member that opposes said first surface thereof, and clamping said glass member on said support portion; and a third step of relatively rotating said support portion and said cover in a state in which an outer peripheral surface of said support portion and an inner peripheral surface of the cover are fitted together.

6. The method according to claim 5, wherein said resin material is a resin cured by activating energy.

* * * * *

UNITED STATES PATENT AND TRADEMARK OFFICE
CERTIFICATE OF CORRECTION

PATENT NO.   :   5,290,488
DATED        :   March 1, 1994
INVENTOR(S)  :   TAKASHI ARAI, ET AL.

It is certified that error appears in the above-indentified patent and that said Letters Patent is hereby corrected as shown below:

COLUMN 4
    Line 6, "embodiment" should read --embodiments--.

COLUMN 5
    Line 11, "in" should read --is--.
    Line 26, "cided" should read --cided.--.

COLUMN 12
    Line 35, "second" should read --seconds--.

COLUMN 16
    Line 10, "inner resin" should read --inner circumferential surface 116b of the cover 116. The resin--.

COLUMN 17
    Line 26, "surface" should read --surfaces--.

COLUMN 20
    Line 31, "mold" should read --molding--.

Signed and Sealed this

Thirtieth Day of August, 1994

*Attest:*

BRUCE LEHMAN

*Attesting Officer*       *Commissioner of Patents and Trademarks*